Oct. 6, 1942.    E. NORDSTROM    2,297,715
PRESSURE REGULATING DEVICE
Filed June 29, 1940
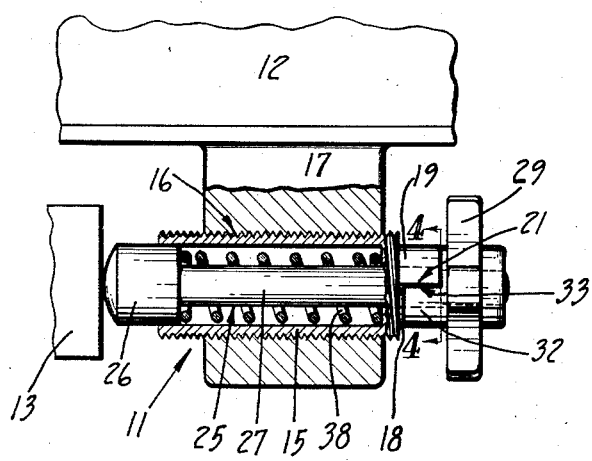
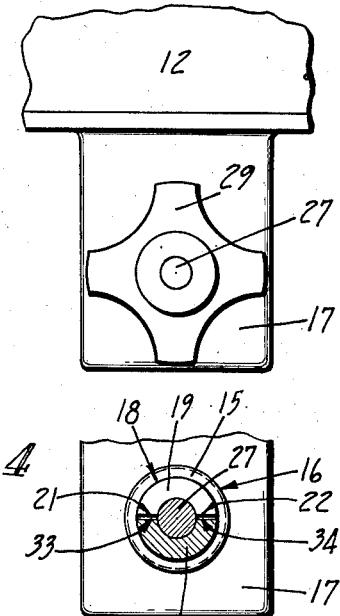
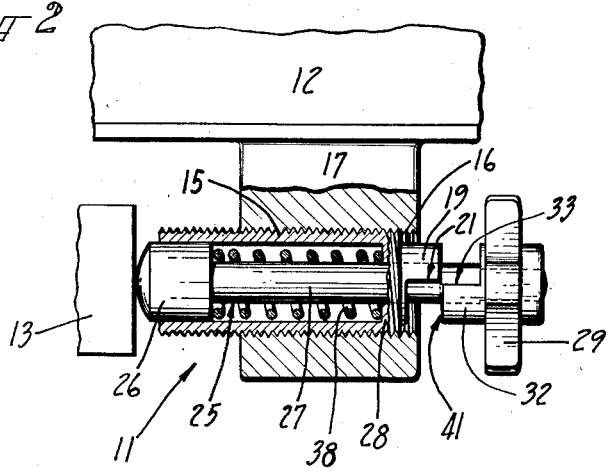
INVENTOR.
Elof Nordstrom
BY Ivan D. Thornburgh
Chas. H. Erne
ATTORNEYS Patented Oct. 6, 1942

2,297,715

UNITED STATES PATENT OFFICE 2,297,715

PRESSURE REGULATING DEVICE

Elof Nordstrom, East Orange, N. J., assignor to American Can Company, New York, N. Y., a corporation of New Jersey Application June 29, 1940, Serial No. 343,305

3 Claims. (Cl. 74—504)

The present invention relates to a pressure regulating device and has particular reference to such a device having a safety feature which prevents further adjustment after reaching a predetermined set maximum pressure.

In various kinds of machinery there are certain movable or partially movable parts which are adapted to be operated under an applied pressure. In some cases the part or parts may require varying pressures or may need frequent pressure adjustments to compensate for wear or other operating conditions. Oftentimes the operators of such machines adjust the pressure on such parts beyond the structural limits of the parts involved and thereby bring about damage to the machine.

The instant invention contemplates overcoming such a difficulty by providing a pressure regulating device which is designed to produce a predetermined maximum pressure best suited for the machine parts involved and which when adjusted to such a maximum pressure becomes inoperative so that further adjustment is prevented.

An object therefore of the invention is the provision of a pressure regulating device wherein adjustment may be had to a fixed predetermined maximum pressure but when this is reached the device cannot be adjusted further.

Another object is the provision of such a device wherein the adjusted pressure may be reduced from but may not be increased beyond the maximum pressure for which the device is set.

Another object is the provision of a device of this character which is manual in operation and which is simple and compact in construction so that it may be installed in small spaces in the machine.

Numerous other objects and advantages of the invention will be apparent as it is better understood from the following description, which, taken in connection with the accompanying drawing, discloses a preferred embodiment thereof.

Referring to the drawing:

Figure 1 is a part sectional, part elevational view of typical machine parts including a pressure regulating device embodying the instant invention, with portions broken away;

Fig. 2 is a view similar to Fig. 1 showing certain of the parts in a different position;

Fig. 3 is an end view of the parts shown in Fig. 1, with portions broken away; and Fig. 4 is a sectional view taken substantially along the line 4—4 in Fig. 1.

As a preferred embodiment of the invention the drawing discloses a pressure regulating device 11 (Fig. 1) which operates in a stationary machine part 12 and which applies a pressure to a movable machine part 13. The stationary machine part may be the main frame or any other part of the machine which is normally stationary relative to the movable part. The movable machine part may be a slide, a roller, a doctor blade or any other part of the machine which is normally movable or partially movable and against which an applied pressure is required for the proper function of the part.

The pressure regulating device 11 preferably includes an externally threaded sleeve or carrier member 15 which is rotatably mounted in a threaded bore 16 formed in a lug 17 or other suitable part of the stationary structure 12. At one end the sleeve is preferably reduced in diameter as indicated at 18 and this end is formed with a lug 19 which extends half way around the end of the sleeve. Such a lug is finished off with flat faces 21, 22.

A plunger or pressure member 25 is carried within the sleeve 15. One end of the plunger is provided with a head 26 which extends beyond the sleeve and engages against the movable machine part 13. The plunger head is formed on a reduced diameter stem section 27 which extends through the sleeve and projects beyond the opposite end where it passes through a bearing 28 formed in the reduced diameter section 18 of the sleeve. This projecting end of the stem carries a hand wheel 29 permanently secured thereto. The hub of the hand wheel is formed with a semi-cylindrical lug 32 having flat aligned faces 33, 34 which are disposed adjacent to and opposite the faces 21, 22 of the sleeve 15 when the device is in normal operating position.

Within the sleeve 15 a compression spring 38 surrounds the plunger stem 27 and is interposed between the plunger head 26 and the sleeve bearing 28. This spring is designed to exert a predetermined longitudinal minimum pressure when initially compressed and to exert a predetermined maximum pressure when compressed a given maximum amount.

Hence when the device is in its initial operating position, as shown in Fig. 1, the spring 38 forces the plunger head 26 against the movable machine part 13 with a pressure which is equal to the initial pressure of the spring. The spring thus draws the hub of the hand wheel 29 on the plunger stem 27 tightly against the outer face of the semi-cylindrical lug 19 of the sleeve. This prevents the spring from pushing the plunger entirely out of the sleeve.

When it is desired to increase the pressure on the movable machine part 13, this may be done by rotating the hand wheel 29. Rotation of the hand wheel in its pressure increasing direction (clockwise as viewed in Fig. 3) first brings the flat face 33 of its lug 32 into engagement with the face 21 of the sleeve lug 19 and then rotates the sleeve 15 in its threaded bore 16. The plunger head 26 frictionally is held relatively stationary in respect to the movable machine part 13 and thus the rotation of the sleeve in its threaded seat shifts it longitudinally of its bore 16. This increases the pressure on the plunger head which in turn transmits this pressure to the movable machine part.

Such rotation of the sleeve 15 moves it longitudinally of the plunger stem 27 and thus slides the face 21 of the sleeve lug longitudinally of the face 33 of the hand wheel lug 32. Hence when the sleeve is rotated a sufficient distance, the face 21 of its lug 19 draws away from the face 33 of the hand wheel lug 32 and thereupon the lug 32 becomes disengaged from the lug 19 riding over the top of it. This is designed to occur at such time when the maximum predetermined compression of the spring 38 is reached. Hence the maximum desired pressure is exerted on the movable machine part 13.

When such a maximum is reached further rotation of the hand wheel 29 only rotates the plunger stem 27 and has no further effect upon the sleeve 15. Hence a greater pressure than the predetermined maximum for which the device is designed cannot be exerted on the movable machine part 13. Thus damage to that or other parts of the machine is prevented.

In order to reduce the pressure by backing off the compression of the spring, the sleeve 15 may be rotated in a reverse direction by rotating the hand wheel in a like direction. For this purpose the outer face, indicated by the numeral 41, of the hand wheel lug 32 is slightly tapered, the incline extending from the flat face 33 to the flat face 34. This taper makes the face 34 slightly longer than the face 33.

Hence, although face 33 of the hand wheel lug 32 will ride over the lug 19 of the sleeve 15, when the hand wheel is turned in a clockwise direction as viewed in Figs. 3 and 4, the corner of the longer face 34 of the hand wheel lug 32 will engage the corner of the face 22 of the sleeve lug 19 when the hand wheel is turned in the reverse direction. This engagement of the corners of the lug faces 22, 34 when the hand wheel is backed off, rotates the sleeve 15 in its threaded bore 16 and permits the spring to expand. It is this expansion of the spring which reduces the pressure on the movable machine part 13 and such a reduction may be continued if desired until the device is returned to its initial pressure conditions.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A manually operable pressure regulating device for exerting a predetermined pressure between a pair of relatively movable machine parts, comprising a carrier member threadedly engaged in one of said machine parts and movable in a lineal direction relative thereto, a pressure member disposed within said carrier member and movable relative thereto, resilient means disposed between said members for forcing the pressure member against the other of said machine parts with a predetermined pressure, and actuating means engageable with said carrier member for moving the same through its threaded engagement with its said machine part in a lineal direction relative to said pressure member to exert and control pressure on said resilient means, and means for automatically disengaging said actuating means from said carrier member when a predetermined maximum pressure is reached, to prevent further increase of said pressure on said other machine part.

2. A manually operable pressure regulating device for exerting a predetermined pressure between a pair of relatively movable machine parts, comprising in combination a sleeve threadedly engaged in one of said machine parts and having at one end a projecting lug by which it may be rotated in said machine part, a pressure plunger within said sleeve, a compression spring interposed between the sleeve and the plunger for forcing the latter against the other of said machine parts with a predetermined pressure, and a hand wheel carried on said plunger and having a projecting lug engageable with the lug on said sleeve, the rotation of said hand wheel through the engaged lugs effecting a lineal travel of said sleeve with a corresponding compression of said spring and effecting a corresponding lineal movement of the sleeve lug relative to the hand wheel lug which releases the lugs when a predetermined maximum pressure is reached so that further compression of the spring is prevented.

3. A manually operable pressure regulating device for exerting a predetermined pressure between a pair of relatively movable machine parts, comprising in combination a sleeve threadedly engaged in one of said machine parts and having at one end a projecting double faced lug by which it may be rotated in either of two directions in said machine part, a pressure plunger within said sleeve, a compression spring interposed between the sleeve and the plunger for forcing the latter against the other of said machine parts with a predetermined pressure, and a hand wheel carried on said plunger and formed with a projecting lug having a short face and an opposite long face engageable with the lug on said sleeve, the rotation of said hand wheel through the engagement of the short face of its lug with a face of the lug on said sleeve effecting a lineal travel of said sleeve with a corresponding compression of said spring and effecting a corresponding lineal movement of the sleeve lug relative to the hand wheel lug which releases the lugs when a predetermined maximum pressure is reached so that further compression of the spring is prevented, the rotation of said hand wheel in an opposite direction bringing the long face of its lug into engagement with the opposite face of the sleeve lug whereupon is had a rotation and lineal travel of said sleeve in an opposite direction to reduce the pressure on said plunger and the resulting pressure on its engaged machine part.

ELOF NORDSTROM.